Dec. 3, 1963   O. MÖDDER   3,112,829
ARRANGEMENT FOR TURNING AND CLAMPING OF WORKPIECES
IN ROLLING MILLS AND THE LIKE
Filed May 8, 1961   4 Sheets-Sheet 1
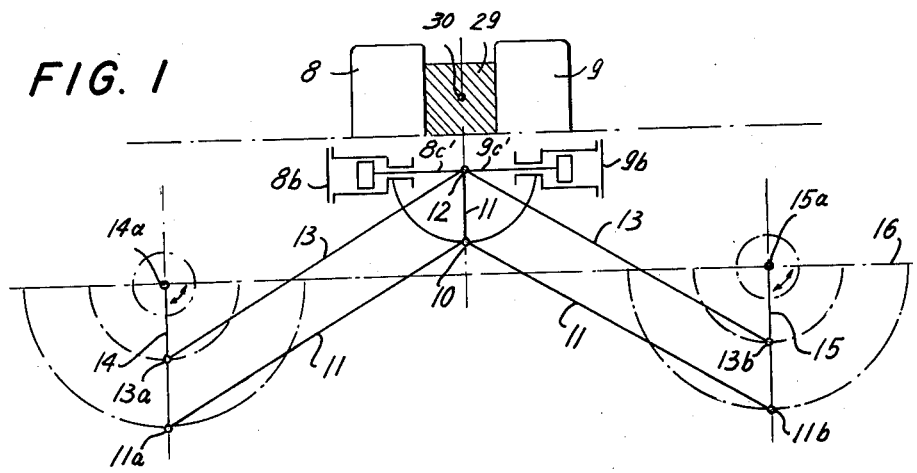
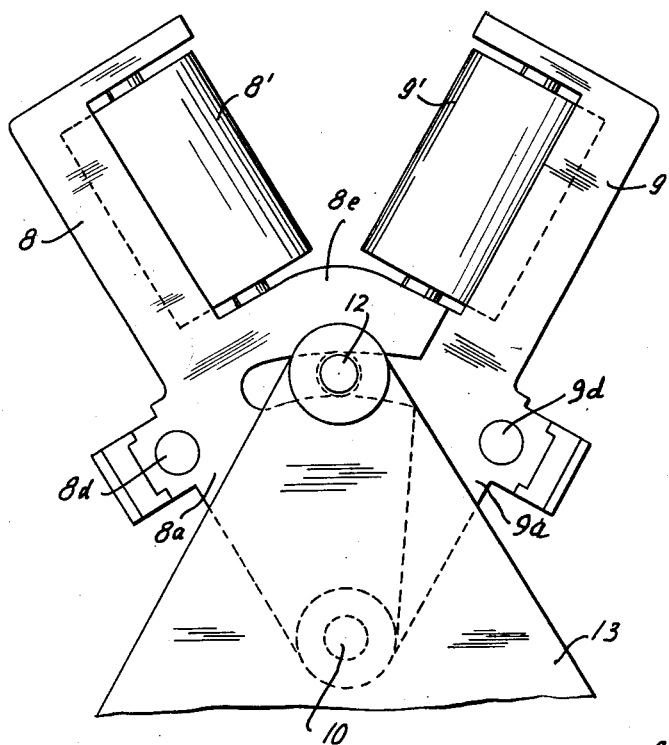
INVENTOR:
OTTO MÖDDER
BY *Michael S. Striker*
ATTORNEY

INVENTOR:
OTTO MÖDDER

BY Michael S. Striker

ATTORNEY

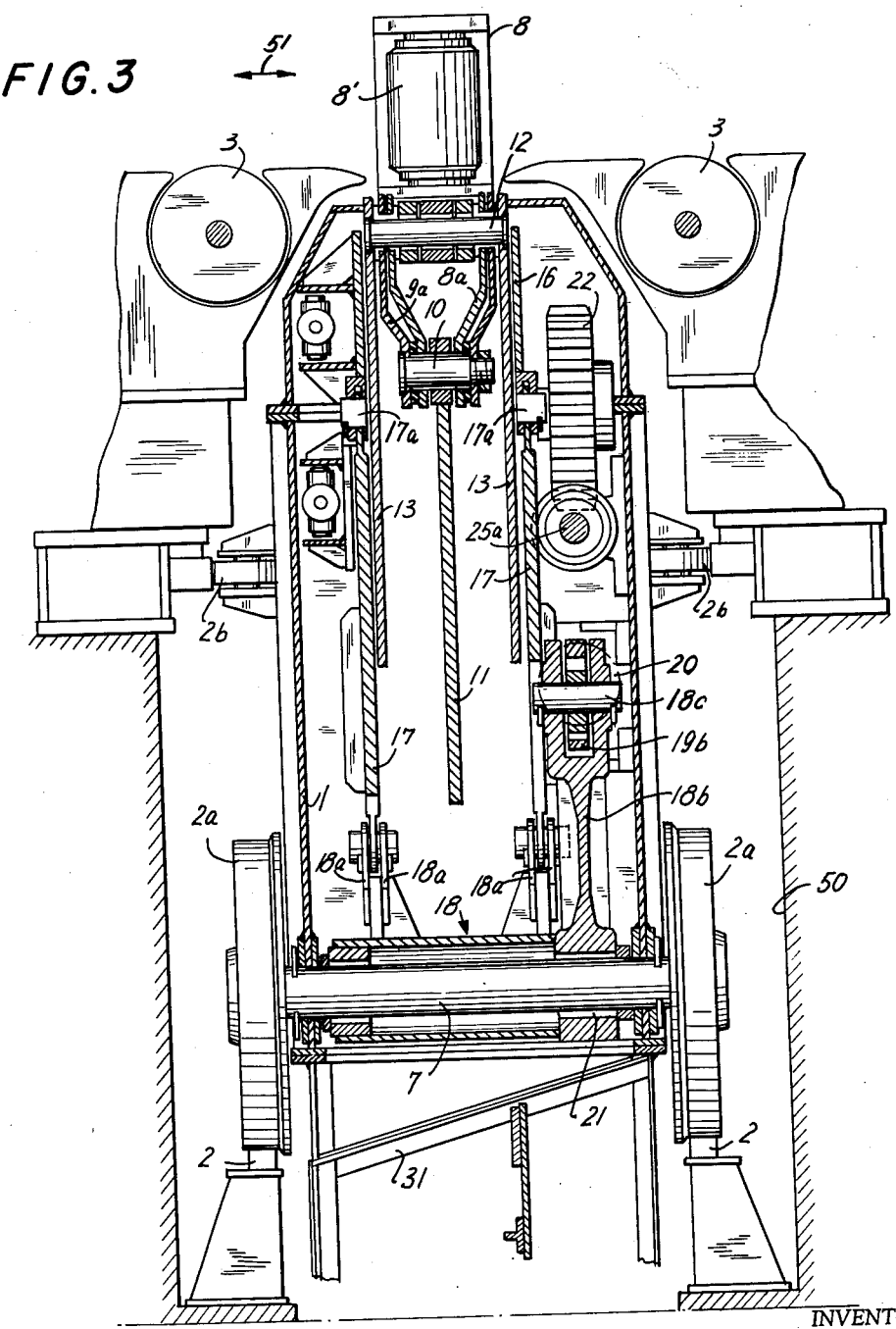

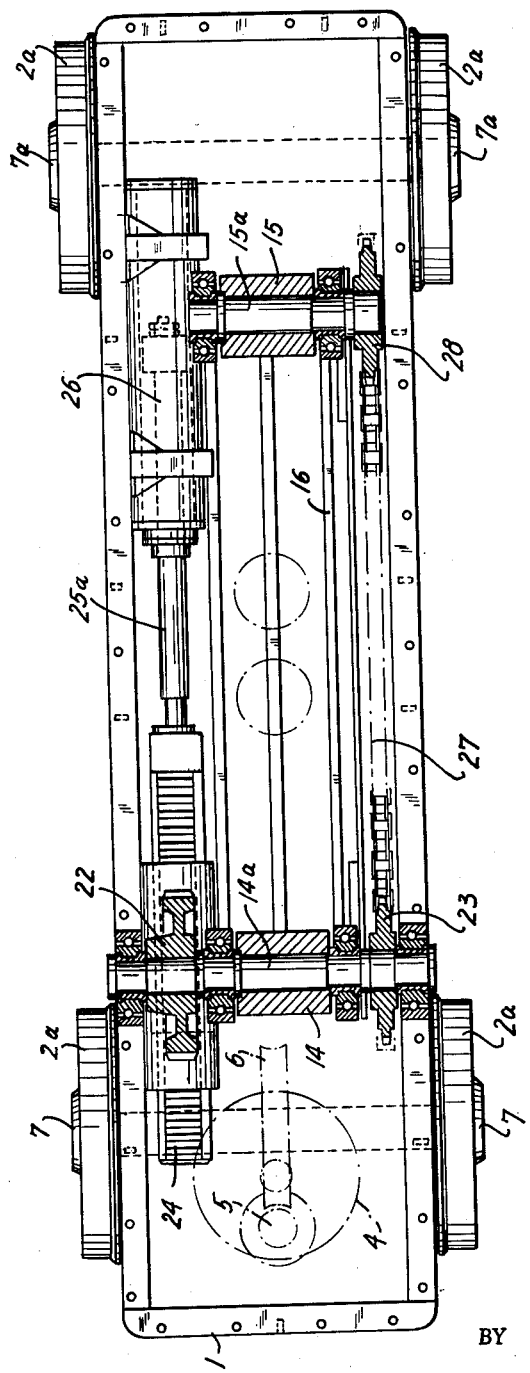

United States Patent Office 3,112,829
Patented Dec. 3, 1963

3,112,829
ARRANGEMENT FOR TURNING AND CLAMPING OF WORKPIECES IN ROLLING MILLS AND THE LIKE
Otto Mödder, Dahlbruch, Germany, assignor to Siemag, Siegener Maschinenbau, G.m.b.H., Dahlbruch, Germany
Filed May 8, 1961, Ser. No. 108,320
Claims priority, application Germany May 9, 1960
10 Claims. (Cl. 214—1)

The present invention relates to an arrangement for turning or tilting of workpieces, and more particularly to a universally adjustable arrangement for supporting, angularly displacing and clamping or holding workpieces in rolling mills and like plants so that the workpieces may be accurately adjusted preparatory to and are properly held during a pass between the roll dies.

A plant for the processing of heavy workpieces, such as blocks, slabs and the like, by means of a reversing blooming or cogging mill usually comprises a large number of auxiliary apparatus including roll tables, work advancing machines and so-called manipulators which serve as a means for turning the work through a given angle preparatory to a pass between the roll dies, and for eventually holding the work until the work is actually engaged by the dies. Such manipulators must be capable of angularly moving the work in clockwise and/or anticlockwise direction and they must be constructed in such a way as to be capable of turning a work through a given angle and with utmost precision in order to insure that the angular position of the work with respect to the roll dies is within a predetermined and usually very narrow tolerance.

An important object of the present invention is to provide a manipulator or work turning and holding arrangement for use in rolling mills which is constructed and assembled in such a way that it may turn a heavy slab, block or bar through full 180 degrees or through a lesser angle, which will not deform a rectangular or square work during the engagement therewith, which may be moved out of the path of a workpiece to permit the transfer of workpieces towards and away from the roll dies, and which allows for independent adjustment of its clamping heads so that the heads may selectively move toward or away from a workpiece located therebetween and that the heads may engage selected faces of the workpieces.

Another object of the invention is to provide an arrangement of the just outlined characteristics whose operation is not affected by the scale which peels off a heated workpiece, which is capable of deflecting and collecting scale separated from the workpieces, which insures that the rolling mill may be operated with little or no interruption, and which may be conveniently operated and moved by a single operator.

A further object of the invention is to provide an arrangement of the above described type which occupies little space, which may be completely concealed in the floor beneath the roll stands, which comprises a comparatively small number of component parts, and which may be readily installed in all or nearly all rolling mills of presently utilized design.

With the above objects in view, the invention resides in the provision of an arrangement for tilting a workpiece or the like which comprises a pair of spaced parallel shafts having axes preferably disposed in a common horizontal plane, a pair of links each of which is connected to one of the shafts, a first carrier which is respectively connected with the first and second links by a first and second pivot member, these first members having axes parallel with the axes of the shafts and the axes of the first shaft and of the first pivot member being located in a first plane which is parallel with a second plane common to the axes of the second pivot member and the second shaft, a second carrier, third and fourth pivot means for respectively connecting the carrier with the first and second links so that the third pivot means is located between and that its axis is parallel and coplanar with the plane common to the axis of the first shaft and the axis of the first pivot means and that the fourth pivot means is located between and its axis is parallel and coplanar with the axes of the second shaft and the second pivot means, the distance between the axis of the third pivot means and the axes of the first shaft and the first pivot means respectively equaling the distance between the axis of the fourth pivot means and the axes of the second shaft and the second pivot means, a pair of work engaging assemblies which are connected to the first carrier intermediate the first and second shafts by a fifth pivot means, sixth pivot means for articulately connecting the assemblies to the second carrier intermediate the first and second shafts so that the axes of the fifth and sixth pivot means are parallel with the axes of the shafts, that the axes of the fifth and sixth pivot means are disposed in a plane which is parallel with the aforementioned planes, and that the distance between the axes of the fifth and sixth pivot means equals the distance between the axes of the first and third or second and fourth pivot means, and means for rocking the links in the same angular direction about their respective shafts whereby the assemblies articulately connected to the fifth and sixth pivot means are turned in the same direction and through the same angle as the links to thereby turn a work held therebetween about an imaginary axis which is located in the plane common to the axes of the fifth and sixth pivot means and whose distance from the sixth pivot means equal the axial distance between the first shaft and the third pivot means.

The links, the shafts and the carriers together constitute a parallel motion mechanism whose purpose is to pivot the work-engaging assemblies connected with the carriers through the same angle through which the links are pivoted about the respective shafts.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a diagrammatic view of a work turning and clamping arrangement embodying the invention;

FIG. 3 is a transverse section through the arrangement as seen in the direction of the arrows from the line III—III of FIG. 2;

FIG. 4 is a horizontal section through the arrangement as seen in the direction of the arrows from the line IV—IV of FIG. 2; and FIG. 5 is a greatly enlarged elevational view of the clamping members which are shown in a position of exaggerated inclination with respect to each other.

Figure 2:
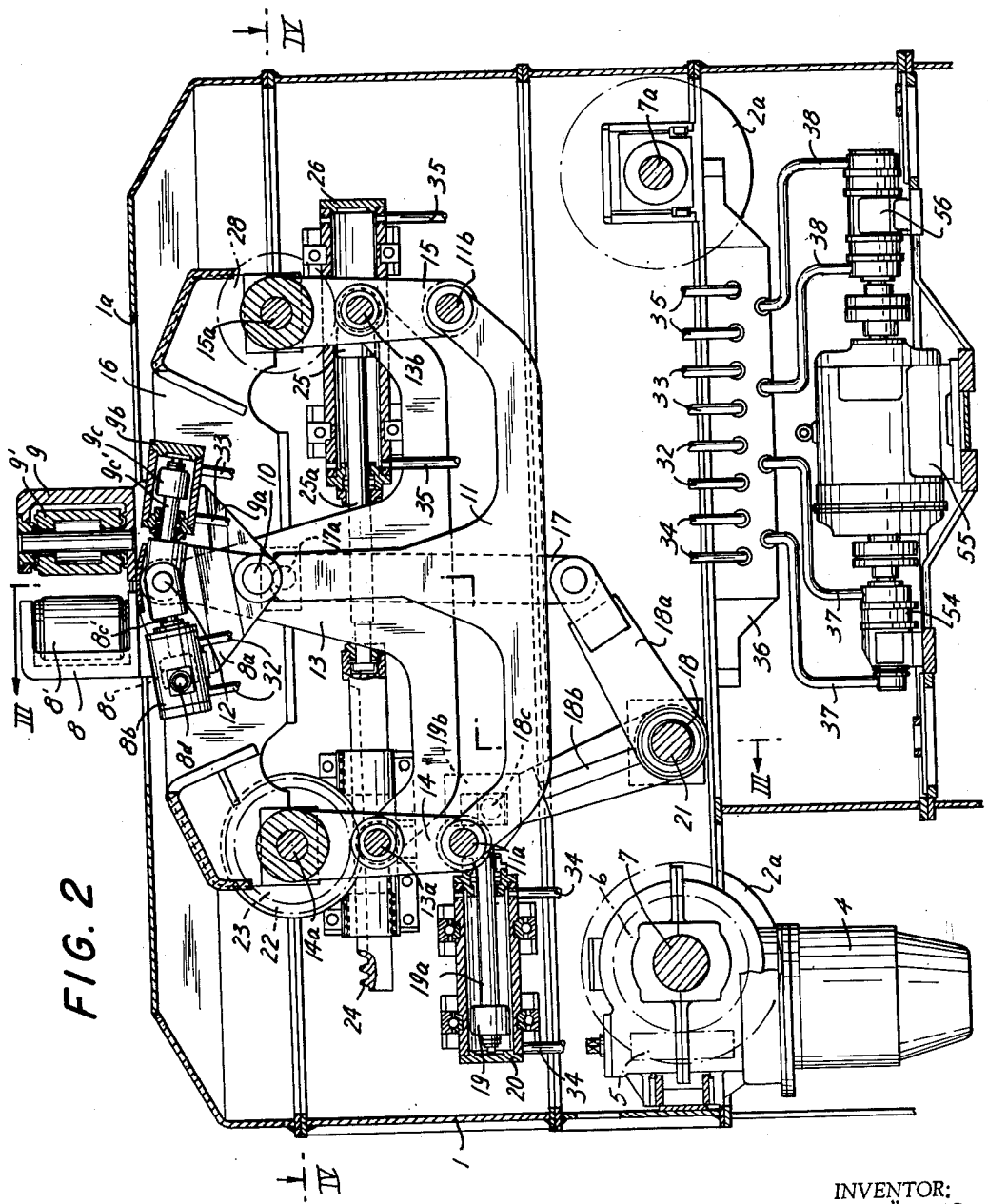
FIG. 2 is a longitudinal central section through the housing of the arrangement.

Referring now in greater detail to the drawings, and first to FIGS. 2, 3 and 4, there is shown a work turning and clamping arrangement which comprises a housing 1 mounted on horizontal axles 7, 7a for spaced pairs of flanged wheels 2a travelling along horizontal guideways or rails 2, these rails being received in a recess 50 provided in the floor of a rolling plant. The rails 2 extend at right angles to the direction (see the double arrow 51 in FIG. 3) in which the work may be moved to be treated by roll dies 3 (only the lower roll dies shown). The axes of the dies 3 are parallel with the rails 2. The axle 7 is driven by a gear motor 4 which is secured to the housing 1 and which drives a worm 5 meshing with a worm wheel 6, the latter coaxially mounted on and keyed to the axle 7. The housing 1 is held against tilting by lateral guide rollers 2b.

The clamping or work-engaging assemblies comprise heads 8, 9 which are respectively mounted on frames 8a, 9a, the latter pivotable about a horizontal pivot member 10 which is mounted in the upwardly extending leg of an inverted T-shaped carrier 11. The frames 8a, 9a carry double-acting fluid motors whose cylinders 8b, 9b are respectively pivotable about a pivot member 8d and about a similar pivot member, not shown. The rods 8c', 9c' of the pistons 8c, 9c in the respective cylinders 8b, 9b are pivotally connected to a pivot member 12 which latter is mounted in the upwardly extending legs of two inverted T-shaped carriers 13. The horizontal legs of the carriers 13 are articulately connected with the intermediate portions of two spaced links 14, 15 which are respectively pivotable about spaced horizontal main shafts 14a, 15a, these shafts being mounted at the opposite longitudinal ends of a bridge or crosshead 16 which constitutes a connecting means for the shafts 14a, 15a. The free ends of the links 14, 15 are respectively connected with the horizontal arms of the carrier 11. The connections between the horizontal legs of the carrier 11 and the links 14, 15 respectively comprise horizontal pivot members 11a, 11b and similar pivot members 13a, 13b connect the ends of the carriers 13 with the links 14, 15, respectively.

The axes of the shafts 14a, 15a are parallel with the axes of the pivot members 10, 11a, 11b, 12, 13a and 13b, and the axes of the parts 14a, 13a, 11a, of the parts 10, 12, and of the parts 15a, 13b, 11b are respectively disposed in three parallel planes with the plane of the parts 10, 12 preferably located midway between the planes of the parts 14a, 15a. The distance between the axes of the parts 14a, 13a equals the distance between the parts 15a, 13b and the distance between the parts 13a, 11a equals the distance between the parts 10, 12 or 13b, 11b.

The median portion of the bridge 16 is pivotally connected to pivot members 17a fixed to the upper ends of levers 17 whose lower ends are articulately fixed to arms 18a of a twin bell crank lever 18, the latter rockable about a horizontal shaft 21 mounted in the housing 1. The other arm 18b of the lever 18 is connected with a follower 18c which is guided in a block slide 19b. The slide 19b is fixed to a piston rod 19a whose piston 19 is reciprocable in the double-acting cylinder 20 of a hydraulic motor mounted in the housing 1, the purpose of this motor being to rock the lever 18 about the shaft 21 and to thereby raise or lower the levers 17 and the bridge 16 together with the carriers 11, 13 and with the frames 8a, 9a. When the frames 8a, 9a are lifted to the position of FIG. 2, the heads 8, 9 of the work-engaging assemblies extend upwardly and through the opening 1a formed in the cover of the housing 1.

The means for rotating the links 14, 15 with their respective main shafts 14a, 15a comprises a pinion 22 which is keyed to the shaft 14a, a sprocket 23 which is also keyed to the shaft 14a, a toothed rack 24 which meshes with the pinion 22, a chain 27 which passes about the sprocket 23 and about a similar sprocket 28 keyed to the shaft 15a (see FIG. 4), and a fluid motor including a double-acting cylinder 26 mounted on the bridge 16, a piston 25 in the cylinder 26, and a piston rod 25a which is fixed to the rack 24.

The operation of the arrangement shown in FIGS. 2 to 4 will now be explained with reference to FIG. 1 which illustrates that the links 14, 15 may be turned about the respective shafts 14a, 15a in clockwise or anticlockwise direction to thereby turn the heads 8, 9 about the imaginary axis 30 of the work 29. The distance between the imaginary axis 30 and the axis of the pivot member 12 equals the distance between the axis of the shaft 14a and the axis of the pivot member 13a, and the axis 30 is coplanar with the axes of the pivot members 10, 12. For example, if the links 14, 15 are rocked through 90 degrees in anticlockwise direction (by the motor 25, 26 through the rack-and-pinion drive 22, 24 and through the chain drive 23, 27, 28), the carriers 11, 13 will be lifted and the carrier 11 will simultaneously move to the right of the carriers 13 so that the pivot members 12, 10 will be located in a common horizontal plane with the imaginary axis 30 of the work 29. The axes of the members 10, 12 are always in a common plane with the imaginary axis 30 of the work regardless of the angular position of the links 14, 15. The heads 8, 9 will be turned in anticlockwise direction through 90 degrees and will turn the work 29 through the same angle about the axis 30. If the links 14, 15 are rocked in clockwise direction, the heads 8, 9 will turn the work 29 in the same direction about the axis 30. It will be noted that the straight lines respectively connecting the imaginary axis 30 with the axes of the shafts 14a, 15a enclose an obtuse angle. In other words the axis 30 and the axes of the shafts 14, 14b are located at the points or tips of an isosceles triangle whose angle adjacent to the axis 30 is larger than 90 degrees. Similar triangles are formed by the axes of the pivot members 12, 13a, 13b, or 10, 11a, 11b.

The work 29 may be turned through full 180 degrees if it is engaged by the heads 8, 9 while the links 14, 15 assume a horizontal position to the left or to the right of the respective shafts 14a, 15a. This will be readily understood since the links 14, 15 may be turned through full 180 degrees from one to the other of their horizontal positions.

The fluid motors 8b, 8c and 9b, 9c are utilized for pivoting the frames 8a, 9a and hence the heads 8, 9 of the two work-engaging assemblies about the axis of the pivot members 10 so as to move the heads toward or away from the work 29. Referring to FIG. 5, the shaft 12 is located beneath an arcuate extension or projection 8e which is rigid or integral with the head 8 and which extends beneath the work-engaging roller 9' of the head 9. This insures that the scale falling off a red-hot workpiece 29 will not come into contact with the pivot members 12 or with the pivot member 10 which is normally located therebelow. In other words, the extension 8e constitutes a protective shield for and is located at a level above the pivot members 10 and 12. The scale chipped off by the rollers 8', 9' of the heads 8, 9 when the rollers engage a workpiece drops through the vertical channel formed between the spaced carriers 13 (see FIG. 3) and drops onto an inclined chute 31 which may be located between and substantially at the level of the wheels 2a. The chute 31 advances the scale by gravity flow to a conveyor or the like, not shown. As shown in FIGS. 1 and 2, the main shafts 14a, 15a are spaced laterally a considerable distance from the heads 8, 9 so that any scale peeling off a heated workpiece cannot descend onto the bearings of and hence cannot impede the rotary improvements of shafts 14a, 15a.

The pressure fluid for operating the fluid motors 8b, 8c and 9b, 9c is delivered by a suitable fluid pump 54, shown in FIG. 2, which is driven by an electric or like motor 55. The motor 55 preferably serves as a means for simultaneously driving a second fluid pump 56 which delivers pressure fluid to the fluid motor 25, 26 for rotating the shafts 14a, 15a. It is preferred to provide a distributor valve 36 which is connected with the pump 54 by conduits 37, with the pump 56 by conduits 38, with the fluid motor 8b, 8c by conduits 32, with the fluid motor 9b, 9c by conduits 33, with the fluid motor 19, 20 by conduits 34, and with the fluid motor 25, 26 by conduits 35. This valve 36 may control the flow of pressure fluid in such a way that the motor 8b, 8c is operable independently of the motor 9b, 9c, i.e. that the heads 8, 9 may be pivoted about the pivot member 10 with respect to each other through equal or through different angles. The individual valve elements of the distributor valve 36 which bring about or prevent a circulation of pressure fluid in the conduit pairs 32—35 may be controlled by suitable electromagnetic, hydraulic, pneumatic or mechanical means from the operator's stand. Such control means may be of any known design and, therefore, are not shown in the drawings.

The bridge 16 is guided in the housing 1 for reciprocatory movements in directions perpendicular to the common plane of the axes of shafts 14a, 15a so that it may lower or raise the heads 8, 9 with the carriers 11, 13 and with the links 14, 15 when the piston 19 is caused to move with respect to its cylinder 20. As shown in FIG. 4, the left-hand main shaft 14a is also guided in the housing 1. The extent of vertical movement of the bridge 16 is selected in such a way that the heads 8, 9 may be caused to descend below the uppermost points of the roll dies 3 shown in FIG. 3, this being of advantage in the event that the work 29 must be moved in the axial direction of the dies, i.e. in a direction at right angles to the plane of FIG. 3.

Without further anaylsis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An arrangement for turning a workpiece or the like comprising in combination, a parallel motion mechanism including a pair of fixed spaced parallel shafts, a pair of spaced parallel links each having one end connected to one of said shafts and another end, first carrier means pivotally connected with the other ends of said links, and second carrier means pivotally connected with said links intermediate said ends thereof; a pair of work-engaging assemblies each pivotally connected with said first carrier means; and means for articulately connecting said second carrier means with each of said assemblies intermediate said links in such a way that, when said links are pivoted about said shafts, said assemblies are pivoted by said first and second carrier means in the same direction as said links.

2. An arrangement for turning a heated workpiece of the type from which scale is likely to peel off during handling, said arrangement comprising a parallel motion mechanism including a pair of fixed spaced parallel horizontal shafts, a pair of spaced parallel links each having an upper end connected with one of said shafts and a lower end, first carrier means pivotally connected with the lower ends of said links, and second carrier means pivotally connected with said links intermediate said ends thereof; a pair of work-engaging assemblies; first pivot means located intermediate said shafts and pivotally connecting said assemblies with said first carrier means; second pivot means located intermediate said shafts and articulately connecting said second carrier means with each of said assemblies intermediate said links in such a way that, when said links are pivoted about said shafts, said assemblies are pivoted by said first and second carrier means in the same direction as said links; and means located at a level above said first and second pivot means for shielding said pivot means from scale peeling off a workpiece which is engaged by said assemblies.

3. An arrangement for tilting a workpiece comprising in combination, a first shaft and a spaced second shaft parallel with said first shaft; first and second link means respectively connected with said first and second shafts; first carrier means; first and second pivot means for articulately connecting said carrier means with said first and second link means, the axes of said first shaft and said first pivot means parallel with each other and disposed in a first plane and the axes of said second shaft and said second pivot means parallel with each other and disposed in a second plane parallel with said first plane; second carrier means; third and fourth pivot means having axes parallel with the axes of said shafts and respectively disposed in said first and second plane for articulately connecting said second carrier means with said first and second link means, said third pivot means located between said first shaft and said first pivot means and said fourth pivot means located between said second shaft and said second pivot means; the distance between the axis of said first shaft and the axes of said first and third pivot means respectively equal to the distance between the axis of said second shaft and the axes of said second and fourth pivot means; a pair of work-engaging assemblies; fifth pivot means located intermediate said shafts for articulately connecting said assemblies with said first carrier means, said fifth pivot means having a pivot axis parallel with the axes of said shafts; sixth pivot means located intermediate said shafts, connected with said second carrier means, and having an axis parallel with the axes of said shafts, the axes of said fifth and sixth pivot means located in a common plane parallel with said first and second planes and the distance between the axes of said fifth and sixth pivot means equal to the distance between said first and third pivot means; means for articulately connecting said assemblies with said sixth pivot means; and means for simultaneously rocking said link means in the same angular direction about the axes of said first and second shafts, respectively, whereby said assemblies are rocked about an imaginary axis which is coplanar and parallel with the axes of said fifth and sixth pivot means in the same angular direction in which said link means are rocked about the axes of said shafts, the distance between said imaginary axis and the axis of said sixth pivot means being the same as the distance between the axes of said first shaft and said first pivot means and said sixth pivot means being located between said imaginary axis and said fifth pivot means.

4. An arrangement for tilting a workpiece comprising in combination, a first shaft and a spaced second shaft parallel with said first shaft; first and second link means respectively connected with said first and second shafts; first carrier means; first and second pivot means for articulately connecting said carrier means with said first and second link means, the axes of said first shaft and said first pivot means parallel with each other and disposed in a first plane and the axes of said second shaft and said second pivot means parallel with each other and disposed in a second plane parallel with said first plane; second carrier means; third and fourth pivot means having axes parallel with the axes of said shafts and respectively disposed in said first and second plane for articulately connecting said second carrier means with said first and second link means, said third pivot means located between said first shaft and said first pivot means and said fourth pivot means located between said second shaft and said second pivot means; the distance between the axis of said first shaft and the axes of said first and third pivot means respectively equal to the distance between the axis of said second shaft and the axes of said second and fourth pivot means; a pair of work-engaging assemblies; fifth pivot means located intermediate said shafts for articulately connecting said assemblies with said first carrier means, said fifth pivot means having a pivot axis parallel with the axes of said shafts; sixth pivot means located intermediate said shafts, connected with said second carrier means, and having an axis parallel with the axes of said shafts, the axes of said fifth and sixth pivot means located in a common plane parallel with said first and second planes and the distance between the axes of said fifth and sixth pivot means equal to the distance between said first and third pivot means, the axes of said first, second and fifth pivot means constituting the points of an isosceles triangle having an obtuse angle at said fifth pivot means; means for articulately connecting said assemblies with said sixth pivot means; and means for simultaneously rocking said link means in the same angular direction about the axes of said first and second shafts, respectively, whereby said assemblies are rocked about an imaginary axis which is coplanar and parallel with the axes of said fifth and sixth pivot means in the same angular direction in which said link means are rocked about the axes of said shafts, the distance between said imaginary axis and the axis of said sixth pivot means being the same as the distance between the axes of said first shaft and said first pivot means and said sixth pivot means being located between said imaginary axis and said fifth pivot means.

5. An arrangement as set forth in claim 4, wherein the means for articulately connecting said assemblies with said sixth pivot means comprises a pair of fluid motors each having a cylinder member and a piston member reciprocably received in the cylinder member, one of said members articulately connected with said sixth pivot means and the other of said members articulately connected with the respective assembly whereby said assemblies are rockable about said fifth pivot means when the piston members are reciprocated in the respective cylinder members.

6. An arrangement as set forth in claim 4, further comprising means for connecting said shafts with each other, means for reciprocating said connecting means in directions substantially perpendicular to the common plane of the axes of said shafts, and means for guiding said connecting means in said last named directions.

7. An arrangement as set forth in claim 6, wherein said reciprocating means comprises a lever articulately connected with said connecting means intermediate said shafts, a bell crank lever having one arm connected with said lever and another arm, and means connected with said other arm for rocking the bell crank lever.

8. An arrangement as set forth in claim 7, wherein the means for rocking said bell crank lever comprises follower means connected with said other arm, means for slidably guiding said follower means, and a fluid motor for reciprocating said guiding means with said follower means.

9. An arrangement for tilting a workpiece comprising in combination, a first shaft and a spaced second shaft parallel with said first shaft; first and second link means respectively connected with said first and second shafts; first carrier means; first and second pivot means for articulately connecting said carrier means with said first and second link means, the axes of said first shaft and said first pivot means parallel with each other and disposed in a first plane and the axes of said second shaft and said second pivot means parallel with each other and disposed in a second plane parallel with said first plane; second carrier means; third and fourth pivot means having axes parallel with the axes of said shafts and respectively disposed in said first and second plane for articulately connecting said second carrier means with said first and second link means, said third pivot means located between said first shaft and said first pivot means and said fourth pivot means located between said second shaft and said second pivot means; the distance between the axis of said first shaft and the axes of said first and third pivot means respectively equal to the distance between the axis of said second shaft and the axes of said second and fourth pivot means; a pair of work-engaging assemblies each comprising a head including a work-engaging roller having an axis of rotation perpendicular to the axes of said shafts and a frame for supporting the head; fifth pivot means located intermediate said shafts for articulately connecting the frames of said assemblies with said first carrier means, said fifth pivot means having a pivot axis parallel with the axes of said shafts; sixth pivot means located intermediate said shafts, connected with said second carrier means, and having an axis parallel with the axes of said shafts, the axes of said fifth and sixth pivot means located in a common plane parallel with said first and second planes and the distance between the axes of said fifth and sixth pivot means equal to the distance between said first and third pivot means; first and second fluid motor means for articulately connecting the frames of said assemblies with said sixth pivot means; and means for simultaneously rocking said link means in the same angular direction about the axes of said first and second shafts, respectively, whereby said assemblies are rocked about an imaginary axis which is coplanar and parallel with the axes of said fifth and sixth pivot means in the same angular direction in which said link means are rocked about the axes of said shafts, the distance between said imaginary axis and the axis of said sixth pivot means being the same as the distance between the axes of said first shaft and said first pivot means and said sixth pivot means being located between said imaginary axis and said fifth pivot means.

10. An arrangement as set forth in claim 9, further comprising a wheel-mounted housing for said carriers and said links, said housing recessed in the floor and having cover means formed with an opening through which said assemblies may extend upwardly and beyond the housing.

References Cited in the file of this patent
UNITED STATES PATENTS
2,815,872  Graham _____ Dec. 10, 1957